Patented Sept. 14, 1954

2,689,244

UNITED STATES PATENT OFFICE 2,689,244

PROCESS FOR PRODUCTION OF CHITIN SULFATE

Rufus V. Jones, Bartlesville, Okla., assignor to Phillips Petroleum Company, a corporation of Delaware No Drawing. Application June 23, 1950,
Serial No. 170,057

19 Claims. (Cl. 260—211)

This invention relates to a method for the production of chitin sulfate.

This compound, in varying degrees of substitution, has found numerous applications in industry as in thickeners for paste, adhesives, and additives for muds used in drilling oil wells.

Heretofore, chitin sulfate has been prepared by treatment of chitin with chlorosulfonic acid and pyridine, the resulting product being subsequently neutralized with a base, such as sodium hydroxide. Many difficulties are encountered in the commercial operation of such processes due to the fact that much of the chitin remains in an insoluble form with resultant decreased yield of the desired water soluble chitin sulfate. Furthermore, in the neutralization of the compound by a base, inorganic salts are formed which are very difficult to remove.

I have discovered a method for producing chitin sulfate wherein the aforementioned difficulties are substantially or wholly eliminated, and numerous advantages are realized. In accordance with my invention, chitin is treated with a selected sulfating agent in a manner such that substantially all the chitin is dissolved with a resultant nearly quantitative yield of chitin sulfate, and contamination of the product by inorganic salts is substantially eliminated. The sulfating agents of my invention are complexes of pyridine, dioxane, N,N-dimethylaniline, or B,B'-dichlorodiethyl ether with sulfur trioxide, these complexes being recognized in the art as definite compounds, although their exact molecular structure has not been precisely established. Other complexes of sulfur trioxide with organic radicals may be used as the sulfating agent without departing from the spirit and scope of the invention. The sulfating reaction is carried out in a solvent consisting of pyridine or other tertiary amine, this solvent having the property of forming complexes or compounds with any acidic substances which might form in the reaction zone. Other suitable tertiary amines are alkyl pyridines, such as picolines, N,N-dimethylaniline, and quinolines.

It will be understood, of course, that pyridine, when used as a solvent, is a separate compound from the pyridine-sulfur trioxide complex utilized as a sulfating agent in a preferred embodiment of the invention.

Either during the sulfating operation or subsequent thereto, the product is contacted with metal ions, preferably alkali metal ions, supplied by an ion-yielding material. The ion-yielding materials of my invention are defined as all water or solvent soluble metal compounds which yield metal ions, particularly the alkali metal and group II-A metal salts and hydroxides such as sodium choride, sodium bromide, sodium hydroxide, and their potassium analogues. Other representative ion-yielding materials are calcium and magnesium chloride, ferric chloride, sodium oxalate, copper acetate, and silver nitrate. The ion-yielding material can be included in the charge to the sulfating reaction, or it can be added during the sulfating reaction, or to the reaction product either before or after the washing step.

An auxiliary organic inert diluent, such as benzene, cyclohexane, or hexane can also be used.

While the mechanism of the reaction has not been precisely established, to the best of my knowledge, the over-all reaction is represented by the following equation:

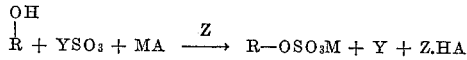

where R represents the chitin nucleus other than the OH groups, the formula of which nucleus is believed to be

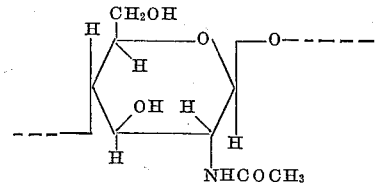

Y represents the organic part of the sulfating agent, that is, pyridine, dioxane, N,N-dimethylaniline, or B,B'-dichlorodiethyl ether; M represents a metal ion, A represents the anion associated with M, and Z represents a tertiary amine, such as pyridine. It will be understood that more than one hydroxyl group of the chitin chain can be substituted in the manner shown, and that many groups in the molecule may not be substituted at all. The molecular weight of chitin is, for the purpose of this application, 203 which is the molecular weight of the above-illustrated chitin nucleus, it being understood that the chitin molecule is made up of a large but indeterminant number of such units.

In the sulfating step, an intermediate compound is formed between the chitin and the sulfating agent, and this intermediate reacts with the ions from the ion-yielding material. For example, chitin reacts with pyridine-sulfur trioxide complex as follows:

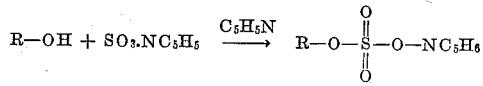

Preferably this reaction is carried out in the presence of pyridine, as shown. This intermediate, when contacted with an ion-yielding material such as sodium chloride, undergoes the following change:

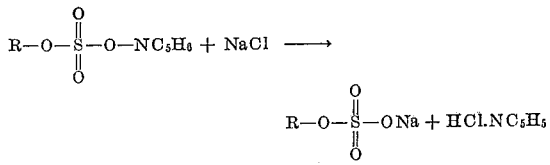

thus yielding sodium chitin sulfate and pyridine hydrochloride. This reaction takes place during the reaction or later in any suitable solvent such as methanol, ethanol, or water. At the end of the reaction the pyridine complex is converted to pyridine and can be used as a solvent in subsequently carrying out the invention. Accordingly, it will be apparent that the pyridine-sulfur trioxide complex is a preferred sulfating agent, since the by-product recovery and utilization presents advantageous features over those of other sulfating agents.

When the sulfating agent consists of a complex of dioxane, N,N-dimethylaniline, or B,B'-dichlorodiethyl ether with sulfur trioxide, the reaction proceeds according to the following mechanism

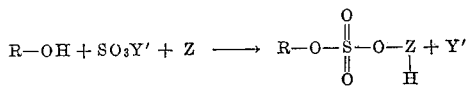

where Y' represents dioxane, N,N-dimethylaniline, or B,B'-dichlorodiethyl ether. The intermediate thus formed will then react with the ion-yielding material as previously shown, either immediately or later, depending on whether the ion-yielding material is present or is added to the system subsequently. Obviously, when the ion-yielding material used is an alkali metal hydroxide such as sodium hydroxide the by-products formed will be water and amine. The reaction with the ion-yielding material may be in the reaction media or conducted in water, ethanol, methanol or any other suitable solvent.

In some instances, and particularly when operating with a small amount of tertiary amine solvent, it may be advantageous to employ a suitable organic diluent such as benzene, cyclohexane, or hexane.

It will be noted, from the above equation, that no inorganic salts are formed by the reaction, the metal ion of the original ion-yielding material combining with the chitin molecule and the anion being included in the tertiary amine complex, or in water if the anion is the hydroxyl ion, formed in the reaction. Accordingly, no difficulties are encountered in separating large quantities of inorganic salts from the reaction products.

In one embodiment of the invention, the material to be treated, the sulfating agent, and the ion-yielding material and solvent are all charged to a reactor in the proportions of 1 to 10 mols of sulfating agent per mol of chitin, 0.5 to 10 mols of ion-yielding material per mol of chitin, 1 to 50 mols of solvent per mol of chitin and up to 40 mols of inert diluent per mol of chitin. If no diluent is used, at least 10 mols of solvent per mol of chitin should be furnished. Preferably, the ion-yielding material is supplied in the proportion of 0.5 to 3 mols of ion-yielding material per mol of chitin as it is desirable to utilize an amount of ion-yielding material only slightly in excess of the theoretical amount required so that this material is substantially completely utilized in the reaction and little or none of it is left in the reaction products. The temperature and ratio of sulfating agent may vary within the aforementioned range in accordance with the degree of substitution desired in the product.

After charging the materials to the reactor, a temperature of 40 to 115° C., preferably 70 to 100° C. is maintained and the reactants are stirred for a period of two to twenty-five hours. The pressure is not critical and, hence, I prefer to utilize atmospheric pressure although higher or lower pressures may be used without departing from the spirit and scope of the invention. When operating at higher than atmospheric pressures, higher temperatures may be maintained in the reactor. At the end of the reaction period, the mixture is cooled and the solid product is separated therefrom by filtration or other suitable means and washed with an alcohol, such as methanol, ethanol, propanol or other suitable oxygenated hydrocarbon to remove excess sulfating agent.

In another embodiment of the invention, the chitin, the sulfating agent, the solvent and the diluent, if any, are charged to the reactor in the aforementioned proportions without, however, adding the ion-yielding material. These materials are heated at temperatures within the range previously described for a period of two to twenty-five hours with stirring. Thereupon, the solid product is washed, as previously described, and an alcohol solution of the ion-yielding material is added. The reaction is continued for another period of two to twenty-five hours. At the end of the second reaction period, the product is separated in the manner previously described. A mineral acid, such as hydrochloric acid, can be substituted for the ion-yielding material if it is desired to obtain chitin sulfuric acid, rather than chitin sulfate.

The group II-A metal salts can also be prepared from a solution of the alkali metal chitin sulfate in a mixture of methanol or ethanol or propanol and water which has been acidified. To such a solution an alcoholic solution of group II-A metal salt is added to obtain the corresponding divalent metal chitin sulfate as a precipitate.

In still another embodiment of the invention, the chitin, the sulfating agent, the solvent and the inert diluent, if any, are charged to the reactor in the aforementioned manner and maintained under reaction conditions for from two to twenty-five hours without the ion-yielding material. The ion-yielding material is then added, with stirring in the manner previously described, with or without the presence of water or alcohol as a solvent. The product is then separated from the liquid phase and washed with the solvents, previously mentioned.

As a specific example, to a mixture of 33 grams or 0.2 mol of pyridine-sulfotrioxide in 150 grams or 1.9 mols of pyridine and 150 grams or 1.9 mols of benzene were added 20 grams or 0.1 mol of purified chitin. This mixture was stirred and heated to 194° F. for eight hours. Heat was discontinued while the mixture was stirred for an additional two hours. After standing for fourteen hours the product was separated by filtration, washed with benzene and methanol. The residue was dispersed in water to give a viscous dispersion. Seventeen grams or 0.4 mol of sodium hydroxide in water were added to the viscous dispersion. Precipitation was effected by pouring the viscous mass slowly into 10 volumes of well stirred methanol. After filtering, the product was washed with methanol until the washings were free of alkali. The product swelled in methanol and became quite gel-like. Ethanol was used in the latter portion of the washing. The alcohol was removed and the product dried in vacuum. A portion for analyses was dried in vacuum over phosphorus pentoxide at 212° F. Analyses gave total sulfur, 9.00 per cent; dialyzed sulfur 0.19 per cent which indicates a product with an average of 0.78 sulfo groups per N-acetyl-glucosamine unit. Substantially 100 per cent conversion of the chitin to water-soluble products was obtained.

As a second specific example, the above reaction is carried out with an equal number of mols of dioxane-sulfur trioxide complex substituted for the pyridine-sulfur trioxide complex.

As a third specific example, the same reaction is carried out with a sulfur trioxide complex of N,N-dimethylaniline substituted for the pyridine-sulfur trioxide complex.

As a fourth specific example, the same reaction is carried out with the sulfur trioxide complex of B,B'-dichlorodiethyl ether substituted for the pyridine-sulfur trioxide complex.

As a fifth specific example, any of the preceding reactions is carried out with an alkyl pyridine, N,N-dimethylaniline or quinoline substituted for the pyridine solvent.

As a sixth specific example, any of the foregoing reactions is carried out with sodium chloride, sodium bromide, potassium chloride, potassium bromide, potassium hydroxide, calcium chloride, magnesium chloride, ferric chloride, sodium oxalate, copper acetate, or silver nitrate substituted for the sodium hydroxide.

As a seventh specific example, any of the above reactions is carried out in the absence of benzene and in the presence of at least 10 mols of tertiary amine solvent per unit molecular weight of chitin.

As an eighth specific example, any of the above reactions utilizing benzene as in inert diluent is carried out with cyclohexane, or any other inert organic diluent substituted for the inert benzene.

While the invention has been described in connection with present preferred embodiments thereof, it is to be understood that this description is illustrative only and is not intended to limit the invention, the scope of which is defined by the appended claims.

I claim:

1. A process for producing a metal chitin sulfate which comprises reacting chitin with a metal ion-yielding material and a sulfating agent consisting of a complex of sulfur trioxide with an organic radical selected from the group consisting of pyridine, dioxane, N,N-dimethylaniline, and B,B'-dichlorodiethyl ether, in the presence of a tertiary amine solvent.

2. A process in accordance with claim 1 in which the solvent is pyridine.

3. A process in accordance with claim 1 in which the ion-yielding material is an alkali metal compound.

4. A process in accordance with claim 3 in which the reactants are in the proportions of 1 to 10 mols of sulfating agent per mol of chitin, 0.5 to 10 mols of ion-yielding material per mol of chitin, and 1 to 50 mols of pyridine per mol of chitin.

5. A process in accordance with claim 4 in which the reaction is carried out at a temperature of 40 to 115° C. for a period of two to twenty-five hours with stirring of the reaction mixture in the presence of an inert diluent.

6. A process for producing an alkali metal chitin sulfate which comprises charging chitin to a reaction vessel together with an alkali metal compound, a tertiary amine, and a sulfating agent consisting of a complex of sulfur trioxide with an organic radical selected from the group consisting of pyridine, dioxane, N,N-dimethylaniline and B,B'-dichlorodiethyl ether in the proportions of 1 to 10 mols of sulfating agent per mol of chitin, 0.5 to 10 mols of alkali metal compound per mol of chitin, and 1 to 50 mols of tertiary amine per mole of chitin, maintaining a temperature of 40 to 115° C. for a period of two to twenty-five hours, and stirring the reactants as the reaction proceeds.

7. A process in accordance with claim 6 in which the sulfating agent is a complex of sulfur trioxide with pyridine, and the solvent is pyridine.

8. A process in accordance with claim 7 in which 1 to 3 mols of alkali metal compound are utilized per mol of chitin, and the reaction is carried out at a temperature of 70 to 100° C. at atmospheric pressure.

9. A process in accordance with claim 8 in which the alkali metal compound is sodium chloride.

10. A process for producing a metal sulfate of chitin which comprises charging chitin to a reactor with a tertiary amine and a sulfating agent consisting of a complex of sulfur trioxide with an organic radical consisting of pyridine, dioxane, N,N-dimethylaniline and B,B-dichlorodiethyl ether in the proportions of 1 to 10 mols of sulfating agent per mol of chitin and 1 to 50 mols of tertiary amine per mol of said substance, maintaining a temperature of 40 to 115° C. for a period of two to twenty-five hours, then reacting the resulting substances in a solvent with a metal ion-yielding material in the proportions of 0.5 to 10 mols per mol of chitin, maintaining a temperature within the aforesaid range for an additional period of two to twenty-five hours, and recovering a metal sulfate of chitin from the reactant materials.

11. A process in accordance with claim 10 in which the sulfating agent is a complex of sulfur trioxide and pyridine, and the tertiary amine is pyridine.

12. A process in accordance with claim 11 in which the ion-yielding material is added in the proportion of 1 to 3 mols per mol of said substance, the temperature is maintained within the range of 70 to 100° C., and the reaction is carried out at atmospheric pressure with stirring.

13. A process in accordance with claim 12 in which the ion-yielding material is sodium chloride.

14. A process for producing acid chitin sulfate which comprises reacting chitin with a sulfating agent consisting of a complex of sulfur trioxide with an organic radical selected from the group consisting of pyridine, dioxane, N,N-dimethylaniline, and B,B'-dichlorodiethyl ether, in the presence of a tertiary amine and treating the resulting salt with a mineral acid.

15. A process for producing a tertiary amine salt of chitin sulfate which comprises reacting chitin with a complex of sulfur trioxide with an organic radical selected from the group consisting of pyridine, dioxane, N,N-dimethylaniline and B,B'-dichlorodiethyl ether in the presence of a tertiary amine.

16. A process for producing a metal salt of chitin sulfate which comprises reacting a tertiary amine salt of chitin sulfate with a metal ion-yielding material in the presence of a solvent.

17. A process for producing chitin sulfate which comprises reacting chitin with a sulfating agent consisting of a complex of sulfur trioxide with dioxane in the presence of a tertiary amine.

18. A process for producing chitin sulfate which comprises reacting chitin with a sulfating agent consisting of a complex of sulfur trioxide with N,N-dimethylaniline in the presence of a tertiary amine.

19. A process for producing a chitin sulfate which comprises reacting chitin with a sulfating agent consisting of a complex of sulfur trioxide with B,B'-dichlorodiethyl ether in the presence of a tertiary amine.

References Cited in the file of this patent

UNITED STATES PATENTS

| Number | Name | Date |
|---|---|---|
| 2,212,521 | Harris | Aug. 27, 1940 |
| 2,335,193 | Nawiasky et al. | Nov. 23, 1943 |
| 2,386,693 | Lecher et al. | Oct. 9, 1945 |
| 2,508,433 | Snyder | May 23, 1950 |

FOREIGN PATENTS

| Number | Country | Date |
|---|---|---|
| 156,307 | Switzerland | Oct. 1, 1932 |
| 156,308 | Switzerland | Oct. 1, 1932 |
| 475,235 | Great Britain | Nov. 16, 1937 |

OTHER REFERENCES

Tage Astrup et al.: Acta Physiologica Scand., vol. 8, pp. 215–218.

Jorgen Piper: Acta Pharmacologica et Toxicologica, vol. 2, pp. 138–148.